June 13, 1939.　　　J. FRASER　　　2,161,920
LIQUID MEASURING AND DISPENSING APPARATUS
Filed July 6, 1937　　　4 Sheets-Sheet 4

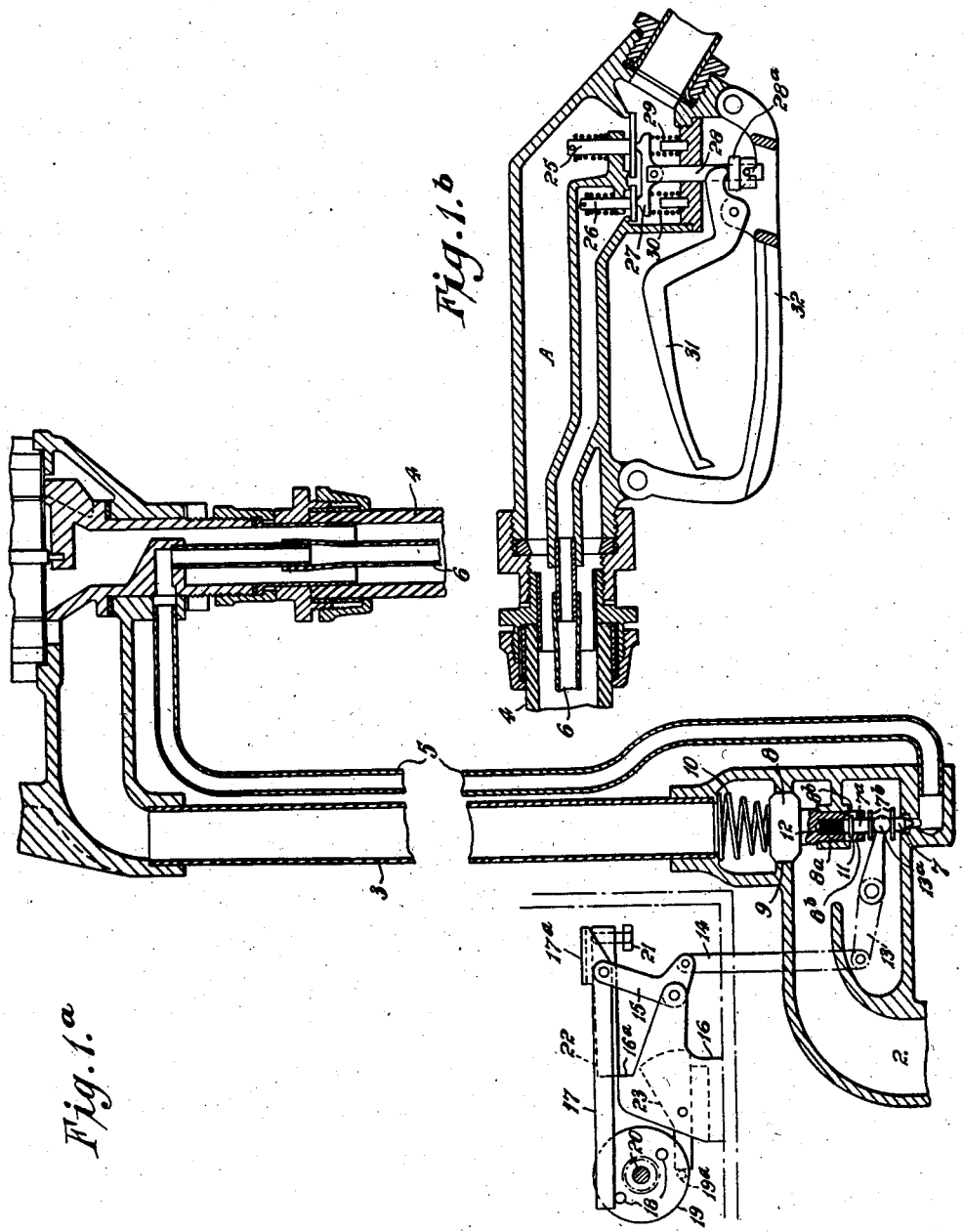

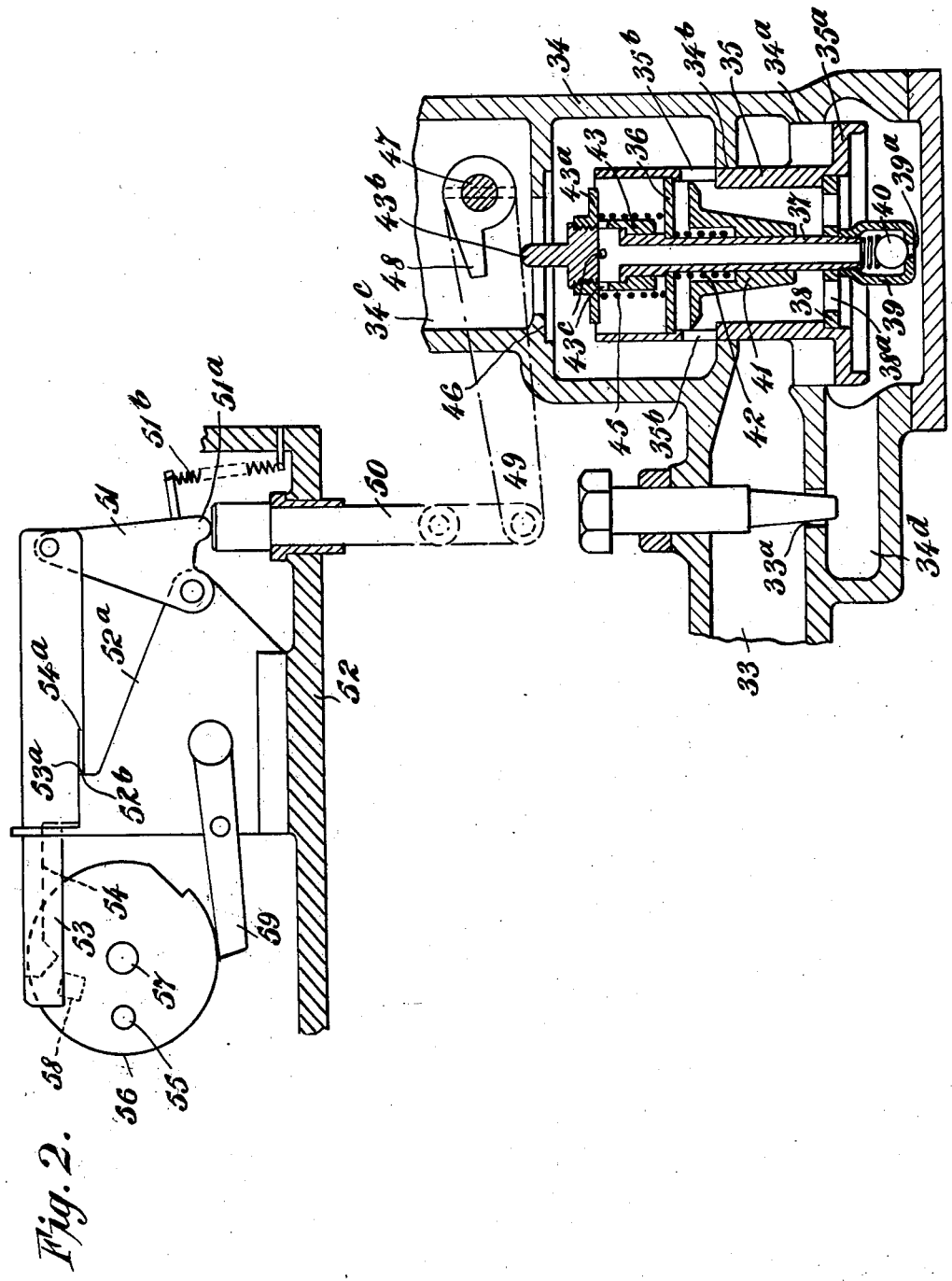

Inventor: John Fraser.
Per:- George E. Folkes.
Attorney.

Patented June 13, 1939

2,161,920

UNITED STATES PATENT OFFICE 2,161,920

LIQUID MEASURING AND DISPENSING APPARATUS

John Fraser, London, England, assignor to Avery-Hardoll Limited, London, England Application July 6, 1937, Serial No. 152,128
In Great Britain July 10, 1936

10 Claims. (Cl. 221—95)

This invention has reference to improvements relating to liquid measuring and dispensing apparatus and is concerned with liquid measuring and dispensing apparatus of the known flow meter kind such for example as described and illustrated in the specification of my pending patent application, Serial No. 742,436 dated September 1, 1934.

With liquid measuring and dispensing apparatus of the aforesaid kind it is usual where the apparatus is not fitted with an automatic pre-determining mechanism for cutting off the supply automatically when a predetermined quantity has been delivered, for the operator to watch the indicator and to shut off the supply immediately the indicator discloses that the required quantity has been delivered. This latter method of operation is open to the objection that the accuracy of delivery depends upon the skill of the operator and necessitates the sudden shutting off of the liquid supply immediately the correct quantity has been dispensed.

The present invention has for its object the provision of an improved control mechanism for liquid measuring and dispensing apparatus of the aforesaid kind which admits of the automatic cessation of the liquid supply when the correct quantity has been delivered.

The invention consists of an improved liquid measuring and dispensing apparatus of the kind hereinbefore referred to having means under the control of the operator for reducing the rate of flow of the delivery to a predetermined amount when a substantial proportion of the quantity to be delivered at any one transaction has been measured, and means under the control of the indicating mechanism for automatically effecting the cessation of the delivery at certain predetermined positions of the indicating mechanism subsequent to the change in the rate of flow, the reduction in the rate of flow, in contra-distinction to a change in delivery pressure, governing the operation of the means for effecting the cessation of delivery thereby enabling the control means under the discretion of the operator, to be actuated to permit flow to take place at a reduced rate, provided this is above the aforesaid predetermined amount, without necessarily entailing a cessation of the delivery.

The invention also consists of an improved liquid measuring and dispensing apparatus of the kind hereinbefore referred to wherein the delivery line incorporates a main delivery section and an auxiliary delivery section and wherein the main delivery section is controlled by a valve under the direct control of the operator and wherein the auxiliary delivery section is controlled by a valve actuated by the indicating mechanism said auxiliary valve being associated with the indicating mechanism so that after the cutting off of the main supply by the operator delivery proceeds through the auxiliary supply until the exact quantity has been delivered when the auxiliary supply is automatically cut off by the aforesaid valve.

The invention still further consists of an improved liquid measuring and dispensing apparatus having a control mechanism for the purpose aforesaid characterised by the incorporation of a flow valve which is responsive to the delivery pressure so as to permit full delivery to take place during the main flow and which valve when the final or dribble flow is taking place is relieved of a degree of pressure which admits of the flow valve automatically effecting a cut-off when the final quantity of a desired delivery has been made.

The invention yet further resides in the details of construction of the improved control mechanisms for liquid measuring and dispensing apparatus to be described hereinafter.

The invention will now be described with particular reference to the accompanying sheets of drawings, wherein:—

Figure 1 is a general view of a liquid measuring and dispensing apparatus in connection with which the invention to be described is employed.

Figure 1ª is a sectional view of one form of the invention.

Figure 1ᵇ is a sectional view of the control means utilised in conjunction with the embodiment of the invention illustrated in Figure 1.

Figure 2 is a sectional view of a modified form of the invention, and

Figure 1:
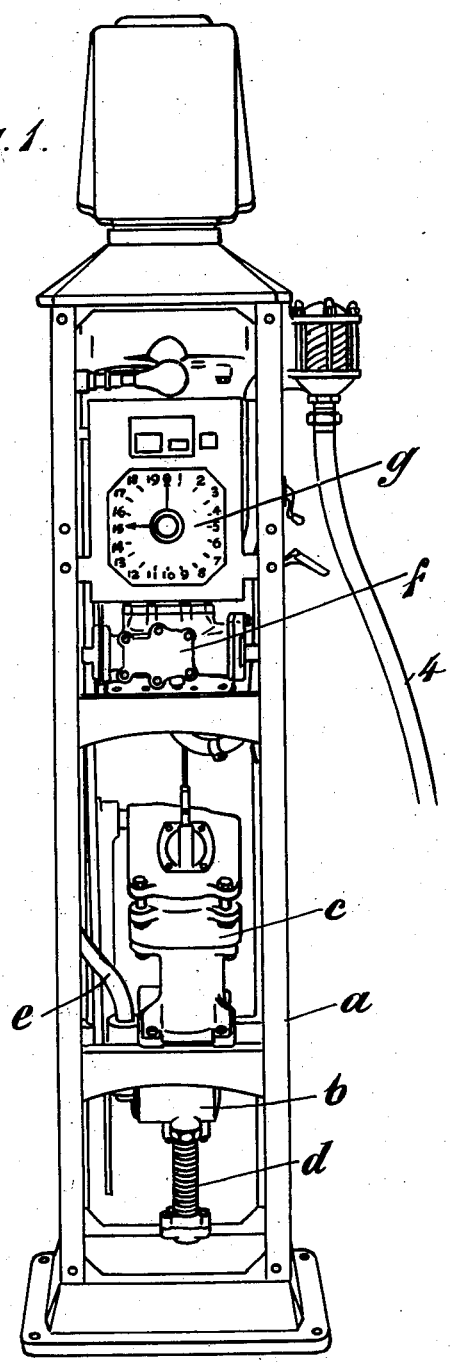

As illustrated in Figure 1 the liquid measuring and dispensing apparatus with which the invention is to be employed includes a standard $a$ in the lower portion of which is mounted a rotary pump $b$ which is driven by a flame-proof electric motor $c$. The inlet side of this pump $b$ is connected by a flexible hose $d$ with a source of supply (not shown) whereas the outlet from the pump $b$ is connected by a pipe to a liquid meter $f$ of the piston displacement type said meter $f$ measuring the liquid passed therethrough and discharging the measured liquid to the flexible discharge hose $4$. The meter $f$ operates an automatic indicating mechanism $g$ for giving a visual indication of the quantity of liquid dispensed at any one operation.

According to the embodiment of the invention illustrated in Figures 1, 1ª and 1ᵇ the outlet 2 from the flow meter is in communication by way of a pipe 3 with the usual flexible discharge hose 4, hereinafter termed the main delivery line 4, and by way of a pipe 5 of smaller bore than the pipe 3 with a hose 6 of much smaller bore which is preferably located within the main delivery line 4, the hose 6 of smaller bore being termed henceforth the auxiliary hose 6. The passage of the delivery from the flow meter to the pipe 5 in communication with the auxiliary hose 6 is controlled by a needle valve 7, henceforth termed the auxiliary valve 7, the stem 7ª whereof is slidably mounted within a sleeve 8ª carried by a piston valve 8 which works within a valve chamber 9 formed in the upper portion of the outlet pipe 2, said piston valve 8 being hereinafter termed the flow valve 8. This flow valve 8 co-operates with a light spring 10 which tends to maintain the flow valve 8 in the closed position. The stem of the auxiliary valve 7 is provided with a cross pin 11 the ends of which engage freely within diametrically opposed elongated slots 8ᵇ formed in the sleeve 8ª adjacent to the lower end thereof. Disposed within the sleeve 8ª and interposed between the end of the bore therein and the upper end of the stem 7ª of the auxiliary valve 7 is a spring 12 which tends to maintain the auxiliary valve 7 on its seating. The stem 7ª of the auxiliary valve 7 is provided with a pair of annular flanges 7ᵇ between which is disposed a ball 13ª formed at the end of one arm of a lever 13 the other arm of which has a pivotal connection to the lower end of a link 14 the upper end of which is pivotally connected to the shorter arm of a bell crank lever 15. This bell crank lever 15 is fulcrumed on a fixed bracket 16 and the longer arm of the said bell crank lever 15 has fulcrumed thereon an arm 17 which co-operates with a pair of diametrically opposed laterally projecting pins 18 carried by a wheel 19 which is frictionally mounted on the shaft 20 of the gallon shaft of the known automatic indicating mechanism to which reference has been made.

The arm 17 has a lateral projection 17ª which co-operates with the nose of a set pin 21 adjustably mounted in the shorter limb of a stop lever 22 which is also fulcrumed to the bell crank lever 15. The nose of the stop lever 22 co-operates with a shoulder 16ª formed on the bracket 16 for a purpose to be set forth hereinafter.

The wheel 19 is provided with a pin 19ª which co-operates with a gravity pawl 23 fulcrumed on the bracket 16 for ensuring the correct location of the wheel 19 after the indicating mechanism has been zeroised.

The main delivery line 4 and the auxiliary hose 6 are connected to a common discharge nozzle A, the outlet from the main delivery line 4 being controlled by a spring actuated valve 25 located within the body of the said nozzle A and the outlet from the auxiliary hose 6 by a similarly located spring actuated valve 26. These valves 25 and 26 are normally maintained on their seatings by a member 27 which is pivotally connected to an upstanding arm 28 the said member 27 being urged normally to the closed position by springs 29 and 30 which however are of different strengths. The upstanding arm 28 carries at its lower end an annular abutment 28ª for the shorter arm of the operating lever 31 which is fulcrumed on a guard 32 fixed to the body of the discharge nozzle A in known manner.

The control mechanism in this embodiment is employed in the following manner:

When it is desired to dispense a quantity of liquid fuel the outlet pipe of the discharge nozzle A is inserted in the filling aperture of the reservoir to be filled and the valves 25 and 26 freed for opening under the pressure of the liquid by the operator raising the longer arm of the lever 31. The full supply pressure from the pump then lifts the flow valve 8 and enables liquid to pass along the main delivery line 4 past the valve 25 and through the discharge nozzle outlet into the reservoir.

The lifting of the flow valve 8 under pressure causes the sleeve 8ª of the said flow valve 8 to co-act with the cross pin 11 to lift the auxiliary valve 7 off its seating. The lifting of the auxiliary valve 7 as aforesaid simultaneously involves the cocking of the stop lever 22 behind the shoulder 16ª.

When the quantity to be dispensed has been delivered to within the major portion of the last half gallon of the amount specified as denoted by the observation of the indicator the operator releases the control lever 31 to an extent which allows the valve 25 to close. This limited release of the control lever 31 also allows the flow valve 8 to close under the action of the spring 10. The auxiliary valve 7 although urged to the closing position by the spring 12 is unable to move to the closing position until one of the pins 18 on the wheel 19 has lifted the arm 17 to a sufficient extent to enable the stop lever 22 to be free of the co-operating shoulder 16ª. This only obtains when a complete half gallon of liquid has been dispensed thus after the closing of the flow valve 8 and the valve 25 the supply is cut off automatically when the succeeding half gallon has been delivered since when this obtains the auxiliary valve 7 is allowed to move on to its seat. The operator finally releases the control lever 31 to ensure the closure of the valve 26.

It will be appreciated that the set pin 21 provides a means of adjusting the relative positions of the arm 17 and stop lever 22 which enables the mechanism to be adjusted to provide a cut off immediately the last half gallon has been delivered.

In the modification illustrated in Figure 2 the outlet from the meter has connection to a pipe 33 leading into the interior of a housing 34 within which is slidably mounted an annular flow valve 35. This flow valve 35 is provided with a finned skirt 35ª of greater diameter than the main body of the flow valve 35 and which is located within a mounting 34ª in the aforesaid housing the main body of the flow valve having a sliding mounting within an annular guide 34ᵇ. The flow valve 35 is divided into upper and lower sections by a transverse diaphragm 36. Co-axial with the vertical axis of the flow valve 35 is a tube 37 which is positioned adjacent to its upper end by the aforesaid diaphragm 36 and at its lower end by a transverse plate 38 secured in the bottom of the valve 35 and provided therein with holes 38ª. Screwed to the lower end of the tube 37 is a cage 39 within which is located a spring actuated ball valve 40 said ball valve 40 controlling a port 39ª in the bottom of the cage. Slidably mounted on the portion of the tube contained in the lower section of the flow valve 35 is a valve 41 of a substantially inverted frusto-conical shape the wider end whereof co-operates with a seating formed in the walls of the flow valve 35 adjacent to ports 35$^b$ therein. This valve 41 is normally urged to the closing position by a spring 42 one end of which abuts the underside of the diaphragm 36 and the other end the bottom of a recess formed in the central portion of the said valve 41. Slidably mounted on the portion of the tube 37 which is located in the upper section of the flow valve 35 is a collar 43 carrying at its upper end a disc valve 43$^a$ said collar 43 having a solid upper portion which terminates in an upstanding projection 43$^b$. The collar 43 is provided in the wall thereof with ports 43$^c$. Interposed between the underside of the disc valve 43$^a$ and the upper side of the diaphragm 36 is a spring 45. The disc valve 43$^a$ co-operates with a seating 46 formed in the upper portion of the housing 34 the space bounded by said seating 46 communicating with a pipe 34$^c$ leading to the delivery hose. Rotatably mounted in the walls of the pipe 34$^c$ is a spindle 47 having fixed thereon an internally disposed stop lever 48 which is located in the path of the aforesaid projection 43$^b$. The spindle 47 also has fixed thereto one end of an arm 49 which is externally disposed said arm 49 having a connection to the lower end of a push rod 50 slidably mounted in bearings carried by a housing 52 containing the indicating mechanism. The upper end of the push rod 50 co-operates with a rounded nose 51$^a$ carried adjacent to one of the lower corners of a triangulated lever 51 which is fulcrumed adjacent to the other lower end on a bracket 52$^a$ supported from said housing 52 said nose 51$^a$ tending to remain in contact with the push rod 50 under the influence of a spring 51$^b$. Adjacent to the upper corner the triangulated lever 51 has pivotally connected thereto a pair of catches 53 and 54 respectively. The catch 53 co-operates with a peg 55 which projects from one side of a disc 56 which is mounted on the gallons shaft 57 of the indicating mechanism whereas the other catch 54 co-operates with a peg 58 which projects from the other side of the said disc 56. The catches 53 and 54 are provided with steps 53$^a$ and 54$^a$ which co-operate with a shoulder 52$^b$ of the bracket 52$^a$ as and for a purpose to be set forth hereinafter. The disc 56 is also provided with a notch 56$^a$ which co-operates with a gravity pawl 59 for arresting the said disc at the zero position after zeroising. The wall of the pipe 33 is provided with a port 33$^a$ which communicates with a bye-pass passage 34$^d$ leading into the bottom of the housing 34 the said port 33$^a$ being controlled by the truncated end of an adjusting screw 60 mounted in the wall of the housing 34 a locknut 61 being provided for locking the said screw in an adjusted position.

Figure 3:
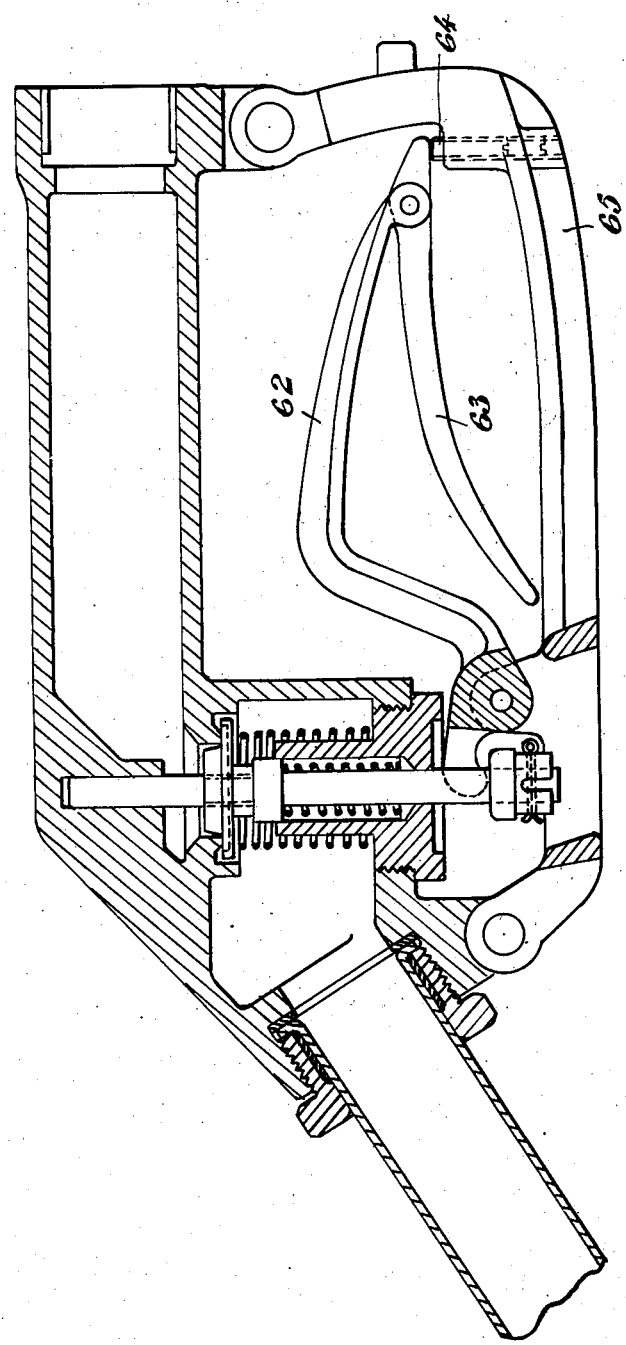
Figure 3 is a sectional view of the control means utilised in conjunction with the embodiment of the invention illustrated in Figure 2.

The delivery nozzle for use with the embodiment of the invention last described and as illustrated in Figure 3 is of standard type with the exception that the trigger lever 62 has associated therewith means for conveying to the operator by a sense of touch whether or not the hose cock lever is in a position which is permitting the full flow or the specific reduced flow. The aforesaid delivery nozzle is not described in detail as its operation is well-known but as illustrated the main trigger lever 62 has fulcrumed thereto an auxiliary lever 63 the longer arm of which constitutes a gripping portion and the shorter arm whereof co-operates with an adjustable screw stop 64 mounted in one end of the trigger guard 65. When the trigger lever 62 is raised for full flow delivery the sense of feel of the said trigger lever 62 is similar to that experienced with the standard type but when this trigger lever 62 is partially released for the specific reduced rate of flow the shorter arm of the auxiliary lever 63 contacts with the stop 64 thereby changing the position of the effective fulcrum of the auxiliary lever 63 and thus conveying by a sense of touch to the operator due to the reduction in resistance of the lever 63 the information that delivery is proceeding at the necessary reduced rate of flow.

The operation of this embodiment is as follows:

When the apparatus is at rest the flow valve 35 is in the open position under the action of gravity but when a delivery is being effected at normal speeds the full force of delivery acts on the skirt 35$^a$ of the flow valve 35 and holds the said valve downwardly whereby the disc valve 43$^a$ is maintained away from the seating 46. The liquid passes between the fins of the finned skirt 35$^a$ of the flow valve 35 into the space between the bottom of the said valve and the bottom of the housing 34 the liquid subsequently passing through the apertures 38$^a$ in the plate 38 and lifting the valve 41 against the resistance of the spring 42. The lifting of the valve 41 permits the liquid to pass through the ports 35$^b$ and thence to the delivery pipe 34$^c$.

It will be appreciated that while delivery is taking place at normal speeds an upward thrust is exerted on the flow valve 35 through the valve 41 which tends to move the disc valve 43$^a$ on to its seat 46 and that this tendency to closing is resisted by the pressure acting on the unbalanced lower portion of the flow valve 35.

Upon the partial release of the trigger lever 62 to permit of the dribble flow after a substantial proportion of the quantity to be delivered at a transaction has been measured say to within the last half gallon the reduction in delivery rate of flow which then obtains results in a pressure on the unbalanced lower portion of the flow valve 35 which is not sufficient to counteract the tendency of the said flow valve 35 to rise. The complete closing of the disc valve 43$^a$ due to this rising movement is prevented however by the stop lever 48 being in an obstructing position relatively to the projection 43$^b$. During the dribble stage delivery proceeds by way of the aperture 39$^a$ in the cage 39, the bore of the tube 37, the interior of the collar 43 and the ports 43$^c$ to the delivery pipe 34$^c$ because the upper end of the flow valve has contact with the seating 46. During the foregoing stage the tendency of the flow valve 35 to rise also results in a compression of the spring 45 as the diaphragm acts as a piston and the ball valve offers a considerable resistance to the flow of liquid through the tube 37.

Prior to the delivery of the last half gallon the step 54$^a$ is engaged behind the shoulder 52$^b$ and consequently any counter-clockwise movement of the triangulated lever 51 is resisted and therefore the stop lever 48 is maintained in the position indicated in Figure 2 to prevent the full closing of the disc valve 43$^a$ on its seating 46 when an upward movement of this valve is allowed consequent upon the reduction of the rate of flow. During the initial stages of the dribble flow the peg 58 contacts with the catch 54 and lifts this catch so that the step 54$^a$ is disengaged from the shoulder 52$^b$. This permits a counter-clockwise rocking of the triangulated lever 51 until the step 53$^a$ of the catch 53 engages with the shoulder 52$^b$ when the continued counter-clockwise movement of the lever 51 is resisted. When the prescribed quantity has been delivered the peg 55 lifts the catch 53 thereby freeing the step 53ª from the shoulder 52ᵇ and allowing a further counter-clockwise movement of the triangulated lever 51. This further movement through the arm 49 allows the stop lever 48 to be moved out of the obstructing position relatively to the projection 43ᵇ whereby the disc valve 43ª is allowed to move rapidly on to its seating 46 under the energy stored in the spring 45 thus completing the cut-off.

As stated hereinbefore an intimation of the movement of the trigger lever 62 to give a reduced rate of flow is conveyed to the operator by the sense of the reduced resistance offered by the auxiliary lever 63.

When a delivery has been effected the flow valve 35 falls thereby permitting the triangulated lever 51 to move clockwise and to move the catches 53, 54 to their setting positions.

It will be appreciated that the catch 54 is moved out of action when the flow valve 35 is open a substantial amount and that the catch 53 is out of its disengaging action at the commencement of a delivery, consequently upon the commencement of the delivery the catch 54 immediately comes into operation and prevents shutting of the valve which otherwise might occur in the initial stages of a delivery.

The adjustable screw 60 permits of a proportion of the delivery passing into the bottom of the housing 34 and enables an initial adjustment to be made of the rate of flow at which the flow valve 35 will rise.

It will be understood that the catches 53 and 54 are actuated throughout a delivery but that they do not come into effective operation until the rate of flow is reduced below the amount which is sufficient to counteract the tendency of the flow valve 35 to rise.

It will be appreciated that since the operation of the automatic delivery cut-off mechanism is dependent upon the reduction in the rate of flow to or below a predetermined amount, that provided the rate of flow exceeds this amount the operator may reduce the rate of flow without bringing the automatic cut-off mechanism into operation thus enabling the operator to meet the case of the filling of a reservoir which is incapable of receiving its charge at the full rate of delivery of which the apparatus is capable.

In the case of an analogous device which is dependent upon the creation of a throttling resistance in the discharge pipe any reduction in the delivery pressure automatically results in the cut-off mechanism coming into operation thus rendering the device unsuitable for use in filling reservoirs which cannot take the full delivery rate.

It has also been proposed in the case of another analogous device to provide a valve mechanism for controlling the delivery in which actuation of a delivery control valve between the pump and the meter is effected by the operator manipulating the nozzle control valve suddenly so as to create a hammer action of the liquid in the dispensing line which results in a rapid rise in pressure which through a bellows or a piston and cylinder device trips a latch which permits of a limited closing of the delivery control valve, the final closing being effected through the agency of the indicating mechanism when a predetermined quantity of liquid has been delivered subsequent to the engendering of the hammer action by such a sudden closing of the nozzle control valve.

This last mentioned prior proposal is open to the objections that it is not desirable to create a liquid hammer action in liquid dispensing apparatus and that the arrangement necessitates a more sensitive adjustment of pressures, and that the mechanism is liable to failure in the case of the employment of the device with refueling arrangements for aircraft in which a long hose line is employed and in which as a consequence there is a possibility of the accidental accumulation of air or vapour in the hose line. Furthermore, in the event of a blow back of the liquid during the filling of a reservoir due to over-rapid filling, the operator will naturally close the nozzle valve suddenly thus engendering a hammer action which will bring the automatic cut off mechanism into operation and bring the apparatus to a standstill and consequently require a resetting operation to be performed before renewed delivery can be effected.

The dispensing apparatus according to the present invention avoids the objections last referred to and it will be appreciated that as the control of the rate of flow is the dominant factor this control could be made by means of a valve on the pump side of the meter or by reducing the speed of the motor without effecting the operation of the invention.

Although the invention has been described in its application to a liquid measuring and dispensing apparatus in which the unit of delivery is half a gallon the invention is equally applicable to liquid measuring and dispensing apparatus in which the unit of delivery is the quantity of liquid which can be delivered to the value of say sixpence.

In this application of the invention the automatic control comes into effect when the last sixpenny-worth of liquid has been dispensed.

Furthermore the invention could be applied to liquid measuring and dispensing apparatus in which the unit of delivery is either a specified volume or a specified price value as may be elected by the customer in which case a change-over mechanism would be used.

As the fractions of a shilling move too quickly to be read during a normal dispensing operation due warning is made of the approach of the completion of sixpenny-worth or a shilling's worth of petrol by arranging coloured bands which increase in intensity towards the sixpenny or shilling indication, consequently the operator has only to observe the colour without requiring to read the actual figure.

Control mechanism as hereinbefore described is readily applicable to existing liquid measuring and dispensing apparatus and ensures an accurate control of the quantity delivered by means which is not entirely under the discretion of the operator.

What I claim is:

1. Liquid measuring and dispensing apparatus of the flow meter type embodying an automatic indicating mechanism, a means under the immediate physical control of the operator for controlling the rate of flow of delivery, a flow valve located in the line of flow which is maintained in the open position solely by the flow when delivery is taking place at a rate of flow above a predetermined minimum but obstructs the flow when the rate of flow is reduced by the operator to or below the said minimum and means controlled by the indicating mechanism for preventing the cutting off of the flow through the agency of the flow valve when delivery is proceeding at or below the aforesaid minimum rate of flow and for automatically causing a cessation of delivery at a predetermined position of the indicating mechanism subsequent to the reduction in the rate of flow.

2. Liquid measuring and dispensing apparatus of the flow meter type embodying an automatic indicating mechanism, means under the immediate physical control of the operator for controlling the rate of flow of delivery, a flow valve located in the line of flow and which is maintained in the open position solely by the flow when delivery is taking place at a rate of flow above a predetermined minimum but which tends to move automatically to the cut off position when delivery takes place at a rate of flow at or below the said predetermined minimum and means controlled by the indicating mechanism which prevents the said flow valve moving to the cut off position after the reduction in the rate of flow except when the indicating mechanism attains a predetermining position after the reduction in the rate of flow.

3. A liquid measuring and dispensing apparatus of the flow meter type embodying an indicating mechanism, a delivery hose, a delivery nozzle at the delivery end of the said hose, valve means embodied in the nozzle under the immediate control of the operator for controlling the rate of flow, a flow valve which is located in the line of flow and which is maintained in the fully opened position solely by the flow when delivery is taking place at a rate of flow above a predetermined minimum but which on a change of hydraulic conditions consequent upon the reduction of the rate of flow to or below said predetermined minimum moves to effect a partial cut off of the delivery and means controlled by the indicating mechanism for preventing the full cutting off of delivery through the agency of the movement of the flow valve except when the indicating mechanism has attained a predetermined position after a reduction in the rate of flow.

4. A liquid measuring and dispensing apparatus according to claim 3, wherein the flow valve is capable of a limited degree of free movement and is maintained in the open position solely by the flow when delivery is taking place above a predetermined minimum rate of flow due to the influence of the flow on an unbalanced portion of the said flow valve and wherein the said flow valve is permitted a degree of closure due to the change in hydraulic conditions on the said unbalanced portion of the flow valve when the rate of flow is reduced to or below the predetermined minimum.

5. A liquid measuring and dispensing apparatus of the flow meter type incorporating a main delivery line, a flow valve interposed between the said main delivery line and the outlet from the meter and which tends normally to cut off communication between the meter outlet and the main delivery line, an auxiliary hose, an auxiliary valve means controlling communication between the outlet from the meter and the auxiliary hose, a discharge nozzle having passages therein communicating with the main delivery line and with the auxiliary hose, valve means located within the nozzle for controlling the outlets from the said passages, a manually operable means which permits of the valve controlling the outlet from the passage communicating with the main delivery line to be closed while the valve means controlling the other passage remains open and means governed by the ordinary indicating mechanism for determining the operation of the auxiliary valve means controlling communication between the meter outlet and the auxiliary hose whereby the said auxiliary valve means is permitted to close only after a unit quantity of liquid has been delivered.

6. A liquid measuring and dispensing apparatus, according to claim 5, wherein the nozzle control valves are maintained in the closed position by a pivotally mounted member carried by a common supporting means which can be displaced by the operator the said pivotally mounted member abutting springs of different strengths.

7. A liquid measuring and dispensing apparatus, according to claim 5, wherein the operation of the auxiliary valve means is determined through a linkage and lever means in association with a trip mechanism controlled by the ordinary indicating mechanism.

8. A liquid measuring and dispensing apparatus, according to claim 5, wherein the flow valve and the auxiliary valve are associated in such a manner that the auxiliary valve means is opened whenever the flow valve is permitted to open.

9. A liquid measuring and dispensing apparatus, according to claim 5, wherein if the manually operable control is operated to effect a cutting off of the delivery through the main delivery line the flow valve is caused automatically to close leaving the auxiliary valve to close automatically when the succeeding unit quantity of liquid has been delivered.

10. In liquid measuring and dispensing apparatus, according to claim 5, the combination with the nozzle of means for indicating to the operator when delivery is taking place at the reduced rate of flow.

JOHN FRASER.